Sept. 15, 1959     L. L. MOORE     2,904,186
FILTER
Filed Jan. 17, 1957
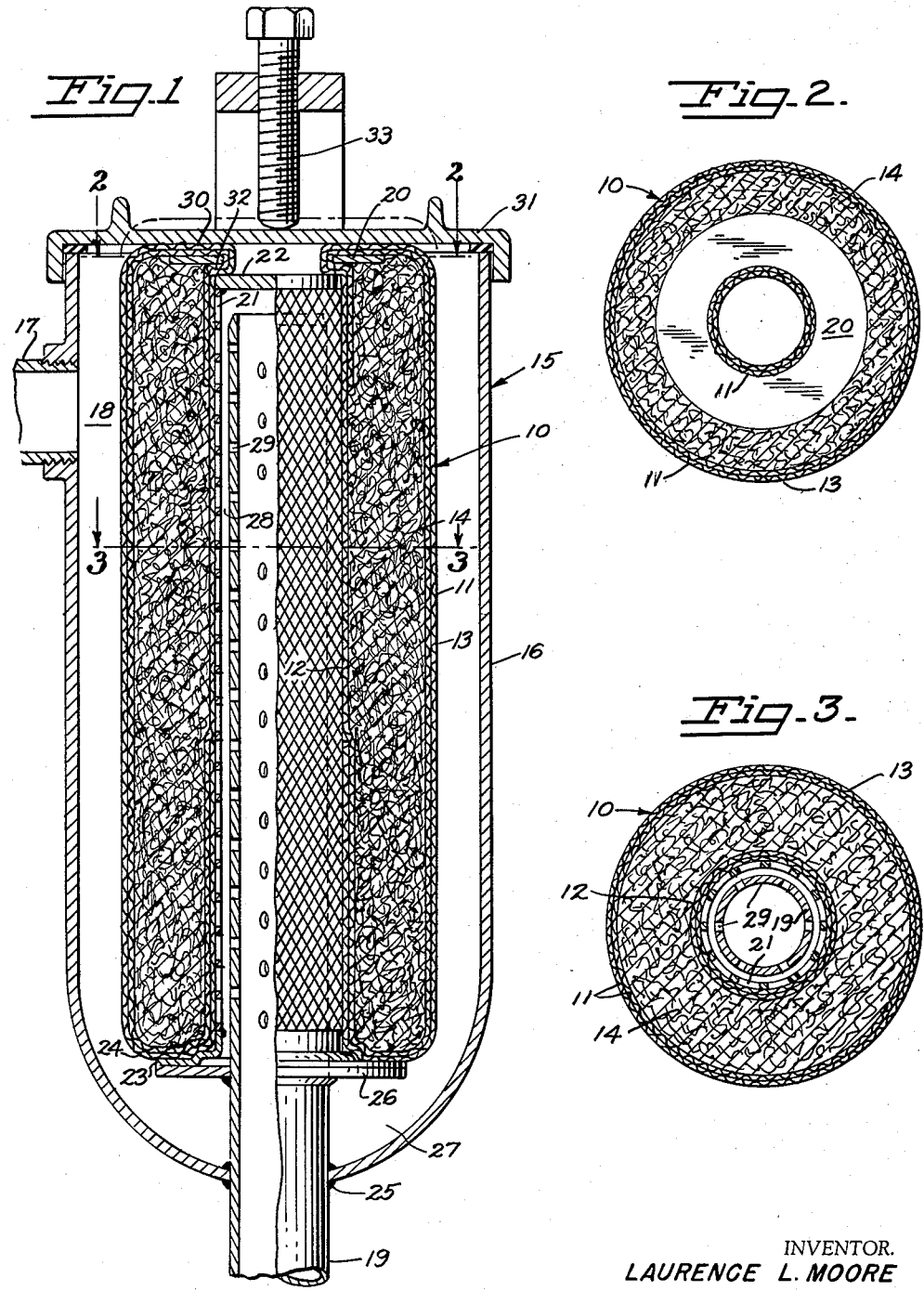
INVENTOR.
LAURENCE L. MOORE
BY
ATTORNEY

2,904,186

FILTER

Laurence L. Moore, Oakland, Calif., assignor to Winslow Engineering and Manufacturing Company, Oakland, Calif., a corporation of California Application January 17, 1957, Serial No. 634,692

5 Claims. (Cl. 210—437)

This invention relates to an improved filter cartridge of a type which is used to filter liquids, including oil, water, petroleum products, and other chemicals.

The excellent filter cartridge shown in Patents 2,314,640 and Re. 24,138 has given superior results, particularly in filtering oil, because of the ability of the cartridge to grow and continually open up pores in the knitted case. This growth means that the filter does not plug quickly but continues to filter for a period many times the life of previous filters. However, there has remained the problem of how to prevent these filter elements from sagging without in any way interfering with the growing action of the outer case or sock. Tests have shown that the addition of inextensible bands is inadvisable for many types of use.

Although it is not completely certain what causes these filter cartridges to sag, it is believed that there are three principal causes:

(1) Vibration. In some installations such as boat operations, the vibration in the engine room constantly acts to shake down the mass of oil-soaked filter material in the element, eventually causing the element to shorten and break away from the upper end seal; if that happens, unfiltered oil leaks through, directly by-passing the filter.

(2) The weight of the element when loaded with oil. Since the cartridge of the type referred to is not supported other than by the cloth covering and the center spring, there is a tendency, especially when several elements are stacked on top of each other, for the weight of the oil-soaked mass itself to cause a settling or shortening of the element.

(3) Oil and air surges. Oil surges (i.e., momentary oil pressures in the galleries that take place during cold starts) are sometimes more than the element, possibly already weakened by the weight of filtered material and oil and by vibration, can resist at its ends. The result has been a forcing away of the element from its end seal. Once this has happened, the end seal is forever broken, since there is no way to force the filter mass back up to its original position. A similar effect occurs if a scavenger pump charges the filter case with more air than the element can handle, such air surges causing the element to shorten. These surges become more and more of a problem as the element loads up with dirt, and in any event the net result is to reduce the life of the element.

This sagging takes place even with filter cartridges that are compressed into place, and is disastrous with such cartridges, since once they sag, the filter element is by-passed.

It is, therefore, an object of the present invention to provide a filter cartridge that will take advantage of the best features of the cartridges shown in Patents 2,314,640 and Re. 24,138, but will also be much better able to withstand sagging.

Another object of the invention is to provide a filter element able to withstand surges of air and oil without breaking the seal with the housing.

Another object of the invention is to provide a filter element which will maintain its seal during vibration instead of sagging away.

Another object is to provide a compressible filter cartridge that will not sag.

Another object of the invention is to provide a filter element that will support a heavy load of oil and filtrate without sagging.

The above objects are achieved by providing a combination with the cartridge fabric casing or cloth covering of (1) a rigid perforate center support for the filter mass, and (2) an annular rigid element made from material not subject to attack, disintegration, or softening by the material being filtered. This rigid ring is positioned inside the cloth covering where it rests on the top of the rigid center tube, which is outside the cloth covering, though surrounded by it, and together they act to maintain the length to which the filter element is compressed when it is placed inside its housing, where it is supported between a washer on a center tube, at its lower end, and a lid at its upper end. The cloth covering is locked between this annular element and the center tube, thereby improving the support of the filter mass instead of depending upon the resistance to compression of the contained filtering material. The compression load is transferred to the rigid center tube, unlike the prior device, which was supported around a compressible spring member. The filter cartridge is made slightly longer than the housing in which it is to fit, and is compressed within the housing.

Other objects and advantages of the invention will appear from the following description of a preferred embodiment presented in accordance with 35 U.S.C. 112.

In the drawings:

Fig. 1 is a view in elevation and in section of an oil filter incorporating a filter cartridge embodying the principles of this invention.

Fig. 2 is a horizontal sectional view of the cartridge taken along the line 2—2 of Fig. 1.

Fig. 3 is a horizontal sectional view of the cartridge taken along the line 3—3 in Fig. 1.

A filter cartridge 10 embodying the present invention is shown in the drawings. The cartridge 10 incorporates a porous knitted tube 11 of fabric formed into an annulus with an interior cylindrical surface 12 and an exterior cylindrical surface 13. The oil will pass from the outside 13 through filter material 14 to the inner surface 12, from which it issues as clean oil. The cartridge 10 is supported, in a manner soon to be explained, in a housing 15, spaced inwardly from the wall 16 thereof. Thus oil enters the housing 15 through an inlet 17 and flows into a space 18 around the cartridge 10. The clean oil that has passed through the cartridge 10 is carried out through a perforated outlet tube 19. As sludge and contaminating materials are removed by the filter material 14, the cartridge 10 grows, as explained in Re. 24,138, and as it grows, the cartridge 10 tends to sag.

In this invention sagging is prevented by the novel combination, in the cartridge 10, of an incompressible washer 20 with a rigid, inextensible perforate tube 21. The tube 21 may comprise a sheet of expanded metal with its ends joined to form a cylindrical shell or tube. The upper end of the tube 21 is welded to a ring 22 to provide a rigid surface for engaging the upper washer 20 in a manner soon to be explained. At the lower end of the tube 21 an annular flange or lower washer 23 is secured, preferably by welding. This flange 23 supports the lower end 24 of the cartridge 10.

The outlet tube 19 is rigidly secured to the housing 15, preferably by a weld 25, and has welded to it a supporting flange 26, preferably above the bottom of the housing 15, to provide a sump 27 below the cartridge 10 where heavy material may settle out. When the cartridge 10 is inserted in the housing 15, the lower washer 23 rests on the flange 26, and the expanded metal tube 21 encircles and is spaced from the tube 19, so that clean oil can pass first into the space 28 between the tubes 19 and 21 and then enter the tube 19 through any of perforations 29, all of which lie above the flange 26.

The upper end ring 22 of the tube 21 lies at a critical distance above the lower washer 23. Above the ring 22 and inside the fabric cover 11, is positioned the annular member 20, a new element in this combination. The ring 20 may be made up of any suitable rigid material such as steel, Micarta, or any other rigid material not adversely affected by the liquid being filtered. Its inner periphery is smaller and its outer periphery is larger than those of the ring 22. This upper washer 20, when placed under compression, comes to rest on the ring 22 at the top of the tube 21, except for the layers 30 of the knitted material 11 between them, and the length of the tube 21 is such that when a lid 31 closes the housing 15, it compresses the cartridge 10 just enough so that the upper washer 20 and the thicknesses 30 and 32 of fabric 11 are snug between the lid 31 and the ring 22. This distance is critical, the compressibility of the cartridge 10 accommodating length differences in itself only. Thus, the rigid tube 21 and upper washer 20 support the cartridge 10 against sag, between the lid 31 and lower washer 26, so that no leakage or by-passing of the filter can occur.

Once compressed to the installed length, the cartridge 10 will not shorten further, since the cloth covering 11 is locked between the washer 20 and the rigid tube 21. The support of the filter mass 14 is greatly improved, because the filtering material 14 no longer bears the compression load directly, this having been transferred to the tube 21. It will be noted that the application of the ring 20 does not reduce the filtering area, since the filtering is taking place radially between the cylindrical walls 12 and 13.

As has been stated, the cartridge 10 is compressed when installed. For example, where the installed length of the element 10 is about 18 inches, its free length will be about 18⅜ inches, plus possibly a quarter of an inch, but no more. Also, as stated, the compression is provided by the cover member 31 that, when in place, forms a part of the metal casing 15 enclosing the cartridge 10. The center tube 19 also forms part of the casing 15; so the cartridge 10 is compressed by the casing 15 from both ends. There may be only one element 10 in each housing 15, or there may be a plurality, and four, six, or eight cartridges 10 per housing 15 is not uncommon.

In operation, as many cartridges 10 as required are inserted in a casing 15, around perforated outlet tubes 19, the lower washer or flange 23 resting on the washer or flange 26 that is part of the tube 19. Then the lid 31 is put on the casing 15 and tightened, as by a screw 33. The result is to compress the cartridge 10, shortening its length and pushing the ring 20 against the ring 22 forming the upper end of the tube 21. The upper washer 20 and tube 21 (with its lower washer 23) thus hold the filter cartridge and prevent it from sagging as oil is filtered in accordance with the principles of Re. 24,138. The inextensible tube 21 and its washer 23 support the filter cartridge 10 in cooperation with the washer 20 that is inside the cartridge 10. Thus, also, any tendency to sag cannot cause any breakage of the seal between the lid 31, upper washer 20, and tube 21, and the cloth portions 30, 32 clamped between the rigid parts 17 and 26. Yet, at the same time, the remainder of the filter, i.e., the vertical cylindrical walls, are free to grow in accordance with the invention in Re. 24,138.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An oil conditioner cartridge adapted for compression in a housing around a rigid perforate tube between and by a lower washer fixed to said tube and a housing lid, said cartridge comprising a rigid inextensible perforate tubular core having a flanged lower end adapted to rest on said lower washer and having an upper end; a cylindrical tubular body with a lower end resting on said flanged lower end, an inner cylindrical wall fitting snugly around said core, an outer cylindrical wall, and an upper end extending above the upper end of said core, said body comprising a porous knitted fabric casing whose openings become enlarged upon its expansion, said casing being filled with a mass of compacted filtering material, whereby the deposit in said mass of foreign substances carried in the fluid being filtered causes said mass to grow and said growth will enlarge the openings in said casing as the casing is expanded; and an upper washer inside said casing at the upper end of said body above said core, said upper washer having an inner periphery smaller than that of said core and an outer periphery larger than that of said core, the length of said core plus the thickness of said upper washer and the fabric casing therearound being equal to the length between said lid and said lower washer, so that when said cartridge is installed and compressed between said lid and said lower washer, said upper washer and the adjacent fabric casing are clamped tightly between said lid and said lower washer, so that growth of said filter mass cannot cause said cartridge to sag away from said lid and permit said fluid to by-pass around said cartridge.

2. In an oil conditioner having a housing, a rigid perforate tube secured to the lower end of said housing, a lower washer on said tube, and a housing lid, the combination therewith of a cartridge comprising an inextensible perforate tubular core having a flanged lower end resting on said lower washer and having an upper end; a cylindrical tubular body with a lower end resting on said flanged lower end, an inner cylindrical wall defining a passage through said body outside said core, an outer cylindrical wall, and an upper end extending above the upper end of said core, said body having a porous knitted fabric casing whose openings become enlarged upon its expansion, said casing defining the surface of said body at all its walls, said casing being filled with a mass of compacted filtering material, whereby the deposit in said mass of foreign substances carried in the fluid being filtered causes said mass to grow and said growth will enlarge the openings in said casing as the casing is expanded; and an upper washer inside said casing at the upper end of said body above said core, said upper washer having an inner periphery smaller than that of said core and an outer periphery larger than that of said core, the length of said core plus the thickness of said upper washer and the fabric casing therearound being equal to the length between said lid and said lower washer, said cartridge being compressed between said lid and said lower washer with said upper washer and the adjacent fabric casing clamped tightly between said lid and said lower washer, so that growth of said filter mass cannot cause said cartridge to sag away from said lid and permit said fluid to by-pass around said cartridge.

3. A fluid conditioner including in combination a housing having walls, a lower end, an upper end, an inlet for unfiltered fluid, an outlet tube projecting above and below said lower end and provided with a flanged support means near and above said lower end, and a removable cap closing said upper end; an inextensible perforate tubular core having an upper end and a flanged lower end that rests on said flanged support means; a tubular filter body having a lower end resting on said flanged support means, an upper end extending a short distance above the upper end of said core, and a porous knitted fabric casing filled with a mass of compacted filter material and spaced inwardly from the walls of said housing; and a washer inside said casing at the upper end of said body above said core, said washer having an inner periphery smaller than that of said core and an outer periphery larger than that of said core, said body being compressible in response to a downward force exerted by said cap on said washer to bring said washer against the upper end of said core with part said casing in between and thereby to prevent further movement of the upper end of said body so that it cannot sag away from contact with said cap.

4. The conditioner of claim 3 wherein the core fits snugly in and against said body.

5. The conditioner of claim 3 wherein the core comprises a tube of expanded metal.

References Cited in the file of this patent
UNITED STATES PATENTS

| | | |
|---|---|---|
| 2,345,848 | Winslow et al. | Apr. 4, 1944 |
| 2,675,919 | White | Apr. 20, 1954 |
| 2,736,435 | Gardes et al. | Feb. 28, 1956 |